(12) United States Patent
Allison et al.

(10) Patent No.: US 10,395,211 B2
(45) Date of Patent: Aug. 27, 2019

(54) APPARATUS FOR AUTOMATED MONITORING AND MANAGING OF INVENTORY

(71) Applicant: Frito-Lay North America, Inc., Plano, TX (US)

(72) Inventors: Chris Allison, Frisco, TX (US); Kuntesh R. Chokshi, Plano, TX (US); Allen Fosha, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 293 days.

(21) Appl. No.: 15/201,721

(22) Filed: Jul. 5, 2016

(65) Prior Publication Data

US 2016/0314433 A1 Oct. 27, 2016

Related U.S. Application Data

(60) Division of application No. 12/623,468, filed on Nov. 23, 2009, now Pat. No. 9,406,041, which is a continuation-in-part of application No. 12/347,075, filed on Dec. 31, 2008, now Pat. No. 8,473,374.

(51) Int. Cl.
*G06F 19/00* (2018.01)
*G06Q 10/08* (2012.01)
*A47F 5/00* (2006.01)
*A47F 10/02* (2006.01)
*G06K 7/10* (2006.01)

(52) U.S. Cl.
CPC ......... *G06Q 10/087* (2013.01); *A47F 5/0006* (2013.01); *A47F 10/02* (2013.01); *G06K 7/10861* (2013.01); *A47F 2010/025* (2013.01)

(58) Field of Classification Search
CPC ...................................... G06F 19/00
USPC ........................................... 705/28
See application file for complete search history.

(56) References Cited

U.S. PATENT DOCUMENTS

| | | | |
|---|---|---|---|
| 2003/0115096 A1* | 6/2003 | Reynolds | G06Q 30/02 705/14.58 |
| 2005/0168345 A1* | 8/2005 | Swafford, Jr. | A47F 1/126 340/686.1 |
| 2009/0018792 A1* | 1/2009 | Kuehnrich | G06Q 10/06311 702/104 |

* cited by examiner

*Primary Examiner* — Russell S Glass
(74) *Attorney, Agent, or Firm* — Colin P. Cahoon; Shaukat A. Karjeker; Carstens & Cahoon, LLP

(57) ABSTRACT

An apparatus for monitoring inventory on a shelf. The invention describes an apparatus for determining the number of packages on a shelf or hanger. The number of packages on a shelf or hanger is determined by detecting the presence of a package on the shelf and adding all detections together to determine the number of product on a shelf. In another embodiment, the product is identified by an identifying device such as an SKU reader. Thus, the quantity and type of product located on a shelf or hanger is known. Such information allows a store to know the type and quantity of packages needed to restock a specific shelf.

19 Claims, 6 Drawing Sheets

APPARATUS FOR AUTOMATED MONITORING AND MANAGING OF INVENTORY

CROSS-REFERENCE TO RELATED APPLICATIONS

This application is a divisional of U.S. application Ser. No. 12/623,468 filed Nov. 23, 2009, entitled "Method and Apparatus for Monitoring Inventory" which is a continuation-in-part of U.S. application Ser. No. 12/347,075 entitled "Method and Apparatus for Monitoring Inventory" filed on Dec. 31, 2008, now U.S. Pat. No. 8,473,374 issued Jun. 25, 2013, the disclosures of which are incorporated herein by reference.

BACKGROUND OF THE INVENTION

Technical Field

The present invention relates to a method and apparatus for monitoring product inventory.

Description of Related Art

Food products and other products are typically sold via shelves or hangers. The product is arranged so that the consumer can easily see and remove the desired package or good. Maintaining product inventory in stock typically requires a person to physically check the store shelves or hangers to maintain inventory and display appearance, which can create inefficiencies by way of repeated trips to monitor and/or restock inventory and of the potential for presenting the consumer with empty or nearly empty shelves. Increasing the efficiency of these trips by knowing which products need to be replenished and when would decrease the number of trips necessary to restock a retail store. Furthermore, currently the restocking personnel must carry excess product quantities and varieties as it is never known how much of each product variety will be needed to replenish a specific retail store or a specific shelf in a retail store.

Consequently, it is desirable to have an inventory monitoring system which provides real time accounting of the product on each shelf. Furthermore, it is desirable that the monitoring system be capable of identifying the type of product on the shelf so that both the product type and quantity of product on a shelf can be known. Finally, it is desirable that the monitoring system be cost effective to maximize the return on investment and profit.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicants' invention will now be described with reference to the drawings. Unless otherwise noted, like elements will be identified by identical numbers throughout all figures.

Generally, this invention relates to a method and apparatus for monitoring inventory on a shelf in real time. Specifically, this invention may be utilized on a self-adjusting shelf. As used herein a "self-adjusting shelf" refers to any shelf or hanger which automatically moves the product to the front of the shelf or hanger. The self-adjusting shelf, just as other shelves, comprises a top, a bottom, a front end, and a back end. In addition, the self-adjusting shelf comprises at least one product support. As used herein "product support" refers to the shelf upon which product sits, the hangers from which product hangs, and any other device which supports product.

In many embodiments the product support lies approximately perpendicular to the vertical orientation of the self-adjusting shelf. Further, the self-adjusting shelf comprises a means for moving the product to the front of the shelf. In some embodiments gravity provides the means for moving the product, and accordingly, no moving parts are necessary. In other embodiments a rotating screw, a spring, or other such means provides the necessary force to move the product to the front of the shelf.

One example of a self-adjusting shelf is a spring loaded shelf which, upon removal of a first product exerts force upon the second product so that the second product assumes the previous position of the first product. Likewise, a rotating screw or other such means provides the force necessary to move the product. These means are typically utilized to position product in a vending machine.

Another example is an inclined plane shelf whereby the shelves are slanted such that when one product is removed, gravity forces the second product to replace the removed product. Such shelves are typically used, for example, to dispense soda cans whereby once the force opposing the downward force of gravity is removed, i.e. the first can, the second can is pulled via gravity to replace the removed can. These inclined planes may additionally have dividers which create separate lanes.

Another type of self-adjusting shelf, for which this invention is ideally suited, is a gravity feed hanger. An example of a gravity feed hanger is depicted in U.S. application Ser. No. 11/832,346 which is fully incorporated herein by reference.

Figure 1:
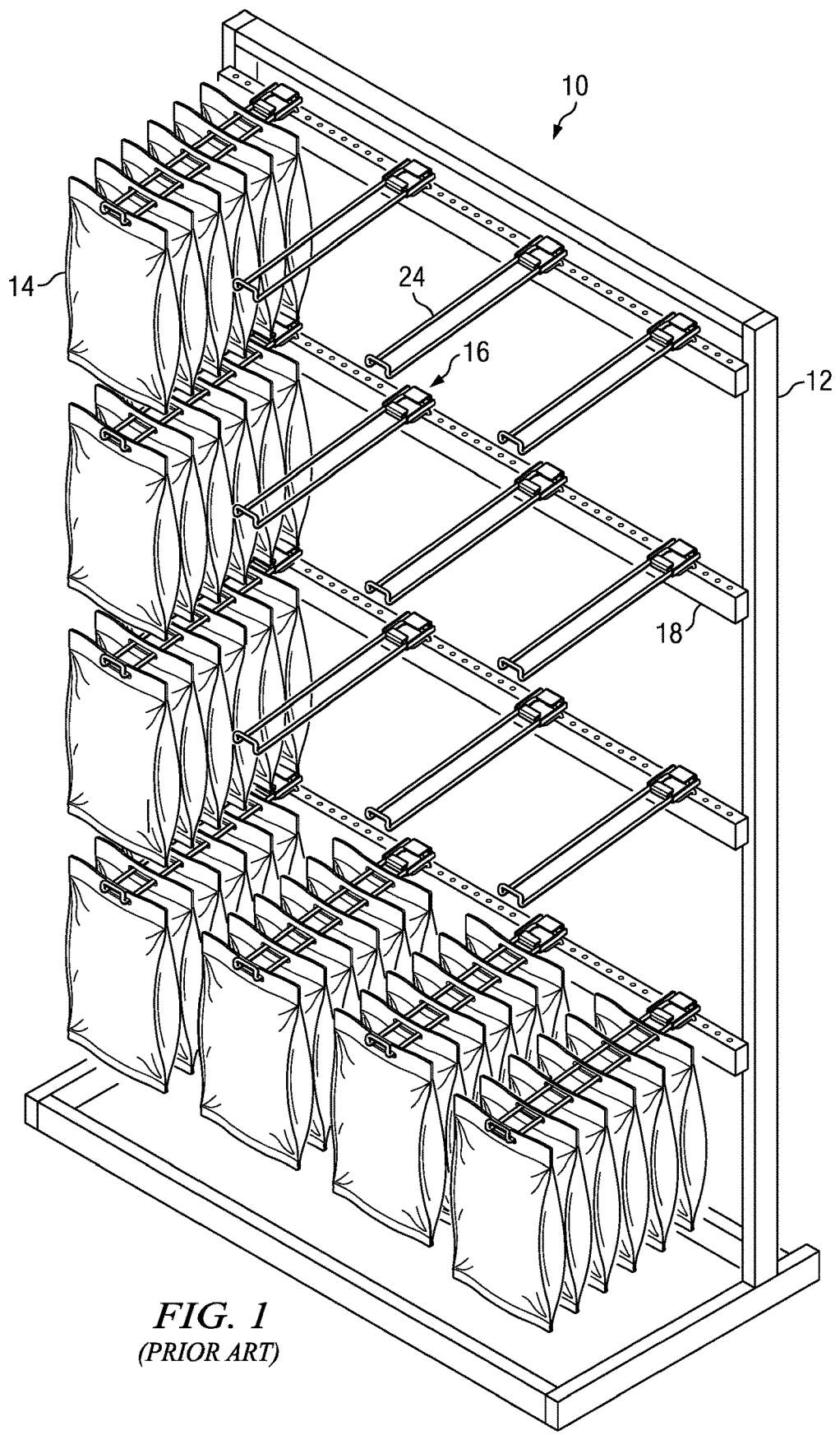
FIG. 1 is a perspective view of a gravity feed hanging system.

FIG. 1 is a perspective front view of a gravity feed system according to one embodiment of the present disclosure. The gravity feed system 10 includes a display apparatus 12, upon and from which a multitude of packages 14 may be displayed and dispensed, respectively. The packages 14 are supported by multiple gravity feed hanger assemblies 16, which are in turn supported by crossbeams 18. The hangers 24 are attached to the hanger assemblies 16. Thus, in the depicted gravity feed system 10, the hangers 24 are the product supports. In one embodiment the gravity feed system 10 comprises at least one product support having sufficient capacity for a plurality of packages. In one embodiment the product support has sufficient capacity for at least five packages.

Although the packages 14 depicted in the Figures includes average-sized flex-bags, which are most commonly suited to the marketing of snack foods, the self-adjusted shelf of the instant invention can be used to store and dispense other items packaged in bags, boxes, traditional pillow pouches, packages which stand upright or other similar containers.

Figure 3:
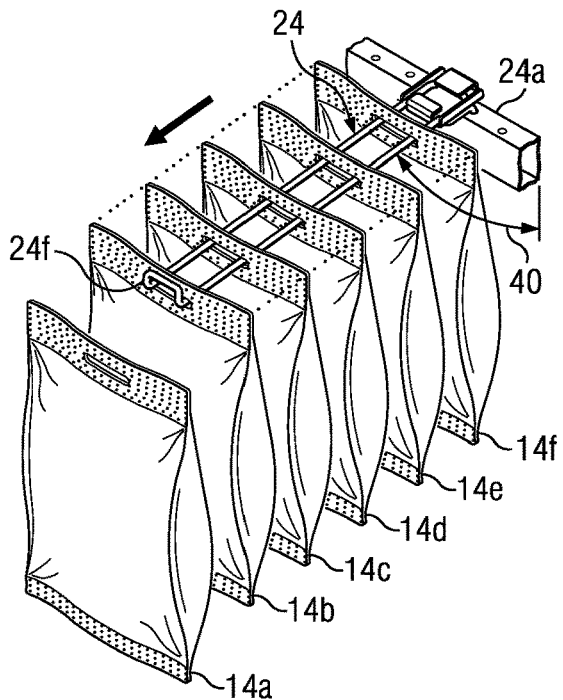

As shown in FIG. 1, in one embodiment, the packages 14 engage the gravity feed hanger assembly 16 via a slot 20 formed in the package tab 22 (as shown in FIG. 3). In other embodiments, this engagement can be obtained through the use of a non-integral tab added to the packages 14 prior to placement of the packages 14 on the gravity feed hanger assembly 16. In still further embodiments, the packages 14 may comprise an integral or attached hook for engaging the gravity feed hanger assembly 16.

Figure 2:
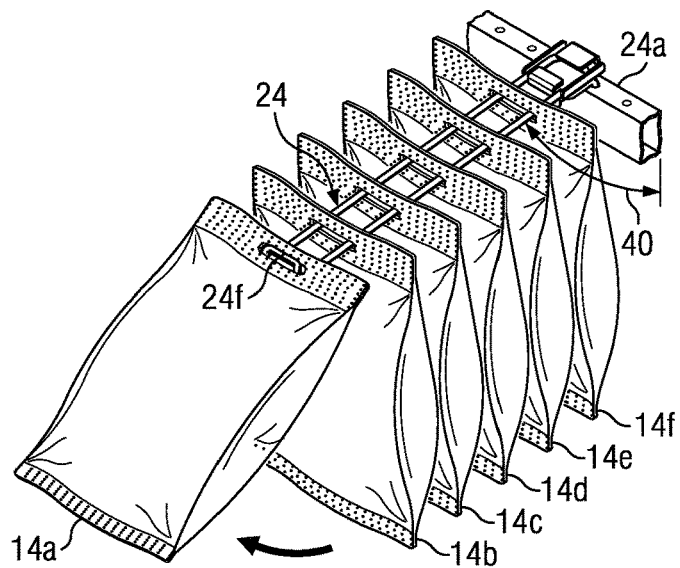
FIG. 2-4 are perspective views, in series, of the removal of the product and the operation of the gravity feed system of FIG. 1.
Figure 4:
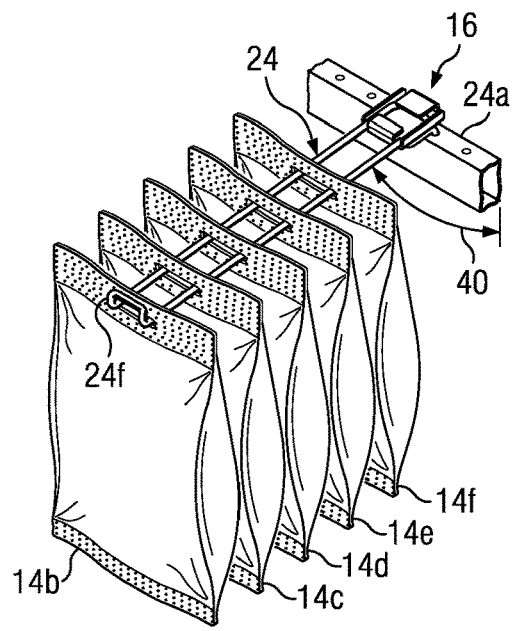

FIGS. 2-4 are perspective views, in series, of the removal of the product and the operation of the gravity feed system of FIG. 1. As seen in FIG. 2, the hanger 24 is supported at an angle 40, as measured from the vertical. This angle 40 may be adjusted due to frictional forces exerted by the hanger 24 and the packages 14a-14f, and those skilled in the art armed with the instant disclosure will be able to determine the desirable angles. In one embodiment the hanger 24 is sloped at an angle 40 less than about 90°. Due to this downward angle, the weight of the packages 14 tends to pull the packages 14 down the length of the hanger 24, absent sufficient friction between the package tab 22 and the hanger 24 to prevent slippage. In some embodiments, the hanger 24 may be powder-coated or otherwise treated with a friction-reducing product so as to facilitate the movement of the packages 14 along the hanger 24.

Despite the force exerted on the package 14 by its own weight, the lip 24f prevents the uncontrolled dispensing of packages 14 by halting the progress of the foremost item of packages 14 at the dispensing end 24b of the hanger 24. The lip 24f, in one embodiment, is long enough to set at an angle sufficient to prevent the hanging stock 14 from being propelled off of the end of the hanger 24 by the force of its own weight, in combination with the cumulative weight of any of the packages 14 that may be trailing behind it.

Controlled dispensing of the package 14 is performed by the manual removal of the foremost package 14a. In the embodiment illustrated in FIGS. 2-4, a foremost item 14a must be manipulated by the individual removing it so that it is pulled both outward and upward, clearing the lip 24f. As the item 14a vacates its position at the bottom of the hanger 24, the second package 14b, no longer impeded by the obstructing leading package 14a, is urged by its own weight to the end of the hanger 24 and is halted by the lip 24f. Thus, what was previously the second package now becomes the leading package. The remaining packages 14c-14f similarly move down the hanger 24, until each of the packages 14c-14f is halted by the item in front of it, so that the length of the hanger 24 nearest the loading end 24a is vacated. As the remaining packages 14b-f are similarly removed from the hanger 24, the space between the package 14f and the latch 26 increases until, finally, the last package 14f is removed and the hanger 24 is emptied.

As the gravity feed hanger system has been described, the apparatus and method of the instant invention will be described in reference to a gravity feed hanger system. It should be noted that while the invention is described in reference to a gravity feed hanger, the invention is not so limited as the invention may be suitably used in any self-adjusting shelf.

Figure 5:
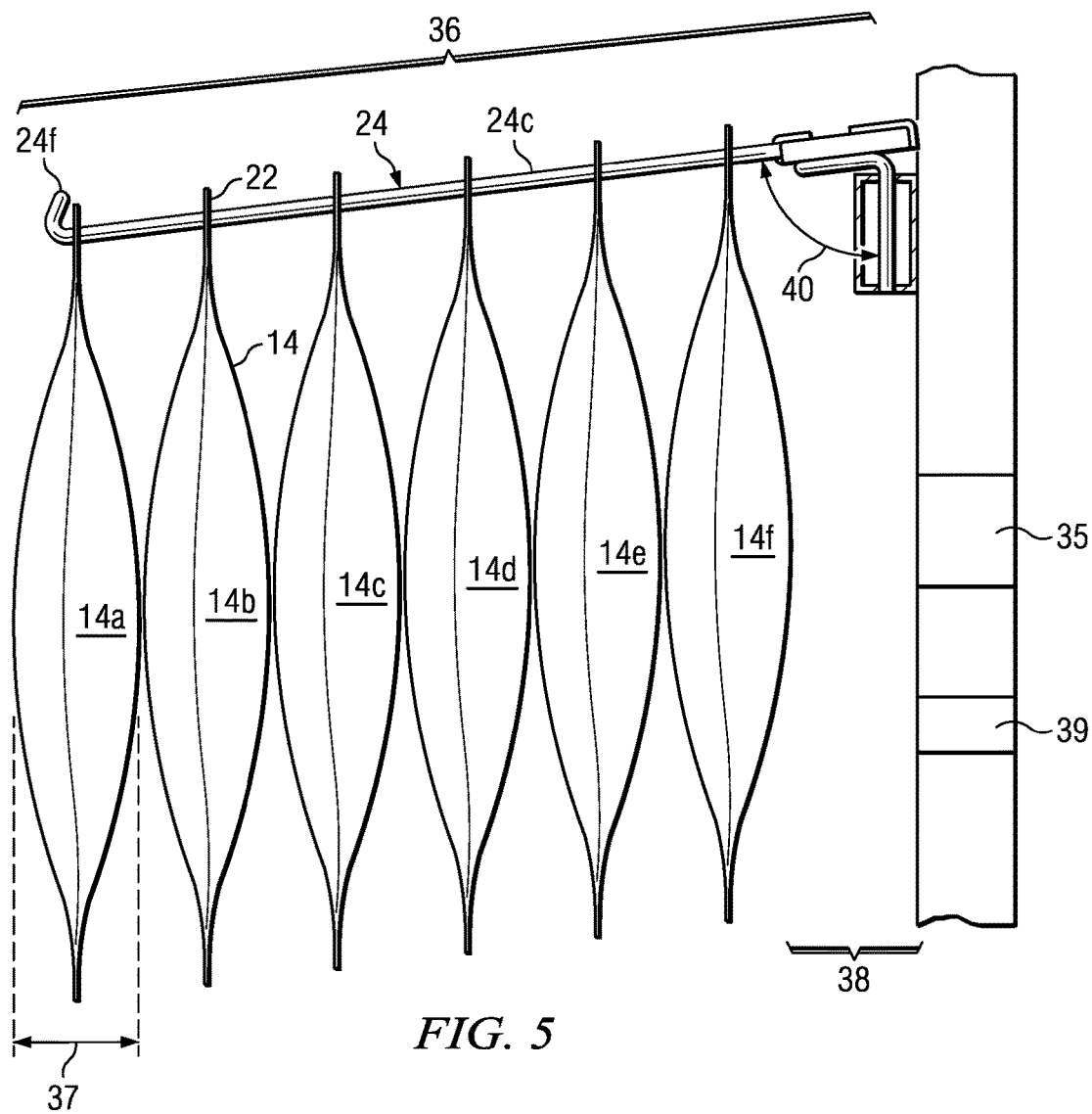
FIG. 5 is a side profile view of one embodiment utilizing a sensor and a bar code scanner.

FIG. 5 is a side profile view of one embodiment utilizing a sensor and a Stock Keeping Unit (SKU) reader. As previously described, the gravity feed hanger system 10 employs gravity to allow the package 14 to fall to the lip of the hanger 24f. Put differently, gravity forces the packages 14 to achieve the greatest possible distance away from the back end of the gravity feed hanger system 10. The front end, as used herein, refers to the face of the shelf wherefrom product is retrieved. The back end of the shelf, as used herein, refers to the side of the shelf opposing the front end. Thus, the back end of the shelf is the end furthest from the consumer retrieving product from the front end. Referring back to FIG. 5, if the distance between the last product 14f (the product closest to the back wall of the gravity feed system 10) and the back end of the shelf is known, the total length 36 of the hanger 24 is known, and the thickness of the package 14 is known, then the number of packages 14 on the hanger 24 can be calculated.

The distance from the back of the shelf to the last product 14f can be measured by a multitude of methods. One method ideally suited for the instant invention is utilizing a sensor 35, as shown in FIG. 5. FIG. 5 also shows the total length 36 of the hanger 24, the thickness 37 of one package 14, and the gap distance 38 defined as the distance between the sensor 35 and the last package 14f. In some embodiments, the total length 36 of the hanger 24 is greater than about 400 mm. In other embodiments, the initial gap distance 38 is less than about 100 mm. The sensor, which is discussed in detail below, measures the gap distance 38. If the leading package 14a (the package farthest away from the back wall of the gravity feed system 10) is removed, the second leading package 14b is pulled downward via gravity and the second leading package 14b then becomes the leading package. The remaining packages 14c-14e and the last package 14f are likewise pulled downward via gravity and also slide down the hanger 14. The sensor 35 now reads a greater distance which corresponds approximately to the sum of the initial gap distance 38 and the thickness of the leading package 14a. Based on the new gap distance 38, the number of packages 14 on the hanger 24 can be calculated by methods known in the art. In FIG. 5, if the leading package 14a is removed, the sensor 35 will measure the new gap distance 38, and the resulting calculation will show five packages remaining on the hanger. Those skilled in the art will appreciate that depending on the sensor selected the sensor may need to be calibrated to obtain accurate and consistent package counts.

There are a variety of sensors which may be successfully employed to measure distance. A sensor, as used herein, refers to any device which determines a distance and converts it into a signal which can be read by an observer or by an instrument. Thus, suitable sensors include, but are not limited to, electronic sensors which electronically measure a distance, optical imaging sensors, lasers, and ultrasonic sensors. Suitable sensors may utilize any method known in the art for measuring and determining a distance. For example, the sensors may use the time of flight method or a method whereby the focal length of a lens is adjusted to determine distance. Thus, in one embodiment the sensor is a camera capable of determining a distance.

Furthermore, both digital and analog sensors may be suitably utilized. In one embodiment, Applicants have found DT-10, a photo-electric analog sensor made by SICK AG of Waldkirch, Germany to be suitable. In other embodiments, Applicants have found PZ-M73, a photo-electric digital sensor made by Keyence Corporation of America of Woodcliff, N.J. to be suitable.

The sensor preferred for a given embodiment is highly dependent upon a multitude of factors including cost, distance, material type, geometry of the package, accuracy needed, etc. Those skilled in the art armed with the disclosure of the instant invention will be able to select an optimum sensor for a given embodiment. For example, in one test for one embodiment, it was determined that in general ultra-sonic sensors yield great accuracy but only for distances over 150 mm. As the gap distance in many embodiments is less than about 150 mm, certain ultra-sonic sensors are unsuitable for the instant invention. Other sensors such as laser sensors are suitable but are traditionally more expensive than the photo-electric sensors. All relevant factors must be weighed and considered when selecting the optimum sensor.

The strength and accuracy needed for a sensor, one factor to consider when selecting an appropriate sensor, is dependent on a variety of factors including the total length of the hanger 24 or shelf employed. For example, in one embodiment, the sensor may need only to read distances as far as the total length of the hanger. In some embodiments sensors may need to be able to measure distances much smaller than the total length of the hanger, for example, distances that correlate to the initial gap distance. Those skilled in the art will be able to determine which sensors are suitable for the ranges desired.

The package material also affects the type of sensor selected. An appropriate sensor can be selected for virtually any material including, but not limited to, metallic films, matte films, cardboard, plastic, paper, and other composite films. These different materials pose varying problems which must be addressed in the sensor selection. For example, the metallic films are more reflective than matte films; however, Applicants have found the aforementioned SICK DT-10 photo-electric sensor to be well suited for both matte film and metallic film packages.

The package 14 geometry also affects the type of sensor selected. For example, thinner packages require a more accurate sensor than what would be needed for use with thicker packages. Applicants believe that those skilled in the art, armed with the disclosure of the instant invention, will be able to select an appropriate sensor for their particular embodiment.

The same factors which affect the sensor selection also affect the sensor positioning. For example, if the package is rectangular then the sensor placement along the length of the package has little effect on the measurement. However, it has been found that in some package geometries, specifically, standard flex packages which often do not have a uniform cross section or thickness, a more accurate gap measurement results if the sensor is aligned with the thickest part of the package. To that end, in some embodiments it is preferable that the pitch of the sensor 35 match the angle 40 of the hanger. Accordingly, in some embodiments it is preferable that the sensor 35 be adjustable both in pitch and lateral placement so that optimal placement may be achieved. Put differently, in some embodiments the sensor 35 is positioned so that it may be raised or lowered vertically, moved horizontally, and angled at a pitch to obtain more accurate measurements. As depicted, the sensor 35 is located flush with the display apparatus 12. However, the sensor 35 can be located in a variety of positions including atop the display apparatus 12 or atop or flush with the cross beam 18. Further, in some embodiments an adjustable mount is provided which supports the sensor 35 in the desired location behind the package 14. The location of the sensor is not critical to the operation of the instant invention, and those skilled in the art armed with the instant disclosure will appreciate that varying placement of the sensor may alter the necessary calibration.

In another embodiment a single sensor is employed to measure the distance for at least two hangers 24. In one such embodiment, the sensor 35 is positioned on a track whereby it may travel horizontally, vertically, diagonally, or a combination of all three to act as a sensor for at least two hangers. Those skilled in the art will appreciate the different methods of positioning a sensor 35 to achieve the desired result of measuring the distances associated with at least two hangers with one sensor.

In some embodiments the sensors have additional capabilities aside from the ability to measure distances. For example, in one embodiment the sensors comprise a "tracking ability." A sensor with such an ability communicates information regarding the measured distance as well as its physical location, for example, within a store. For example, the sensors can be in communication with a wireless card or antennae which can use a variety of methods, such as triangulation, to determine its location. Additionally, the sensor can be equipped with Global Positioning System (GPS) technology or other equivalent technology known in the art. It should be noted that the tracking ability, and the necessary technology, is not limited to being located on the sensor. The shelf or product support, as well as the harvesting device or Stock Keeping Unit reader, both discussed below herein, can all comprise the tracking ability and the necessary technology. For example, rather than the sensor being connected to GPS technology, the shelf itself is attached to the GPS technology. The ability to track a shelf's location, within a store, for example, allows the retailer to strategically position certain products throughout a store and along a shelf. Those skilled in the art armed with the instant disclosure will appreciate the various means for providing the sensor with a tracking ability.

Regarding the determination of the product type and ultimately package thickness, there are a variety of methods to ascertain the thickness of the package 14. In one embodiment the thicknesses of packages with similar products is averaged to determine a standard assumed thickness for that specific package. This standard thickness is then input into a computer in communication with the sensors and is stored. As used herein "communication" includes physical communication via wires as well as wireless communication both directly and through intervening devices. Thus, once the data from the sensor 35 is received, the computer ascertains the thickness of the specific package 14 from a database for example, and can then calculate the number of packages 14 remaining on the corresponding hanger. Thus, the retail store and whoever else has access to the data will know exactly how much product is needed to replenish a specific hanger.

In another embodiment the apparatus comprises the ability to identify the product and package type. This gives the apparatus the ability to determine, for example, the package thickness for a given package without the need for manually inputting a known or averaged product thickness to correspond to a specific shelf. This has a benefit in that a specific product is not limited to a specific shelf. Accordingly, a product which comprises a certain package thickness can be removed from a hanger and replaced with a product comprising a different package thickness and the apparatus will automatically recognize the new product and its associated new thickness. In one embodiment the average thicknesses for all products is entered into a computer or other like device, and the computer utilizes the identified package and its stored associated average thickness to calculate the number of packages on a shelf.

In one embodiment the product is identified by its Stock Keeping Unit (SKU) identifier. Packages generally have unique SKU's which identify the type of product, an example of which is a bar code. Another example of an SKU is a "colored dot" scheme typically employed to identify the color scheme on a package. Unique selection and orientation of these colored dots provides a unique SKU. Finally, a unique image or set of characters located on a package also serves as an SKU.

In one embodiment the apparatus further comprises an SKU reader. An SKU reader refers to any device which can scan or otherwise recognize an SKU. Thus, an SKU reader includes, but is not limited to, a bar code scanner, and a camera.

The location of an SKU reader 39 in one embodiment is illustrated in FIG. 5. As with the sensors previously addressed, there are a variety of factors which affect the selection of an appropriate SKU reader. Regarding range, a preferred SKU reader 39 should have the ability to read at distances as far as the length 36 of the hanger 24 or further and as near as the gap distance 38. Furthermore, as with the sensors, the package material and geometry also affects the selection of the SKU reader. Applicants believe that those skilled in the art armed with the instant disclosure will be able to select an appropriate SKU reader to employ in a given embodiment.

As with the sensors, the location of the SKU reader is one factor which must be considered. The product SKU can be located in a variety of places on a package. Accordingly, the SKU reader is located to allow the reader to correctly read the SKU. In a preferred embodiment, the SKU reader is horizontally and vertically adjustable relative to the shelf to allow for more accurate positioning. Thus if a new package which has an SKU on the bottom-left of the package is replaced with a package which has an SKU on the bottom-right, the reader can be adjusted laterally to read the SKU on the new package. Further, in one embodiment the pitch of the SKU reader is adjustable to allow the SKU reader to follow the angle 40 of the product supports. Finally, in one embodiment the SKU reader is moveable along the shelf so that one SKU reader has the ability to read the SKU associated with packages located on two or more different hangers or shelves.

The apparatus in FIG. 5 has the ability to measure the distance between the sensor 35 and the last package 14f. Furthermore, the SKU reader 39 can recognize the last package 14f and accordingly ascertain its thickness, for example, by retrieving the thickness from a database. With this information, the computer or other like device can calculate the number of packages on the hanger as well as identify the type of product in each package.

Another method for identifying a package or product type, and thus ascertaining the package thickness is utilizing Optical Character Recognition (OCR). OCR is a process in which software reads text and/or characters in an image. The software is trained to identify and recognize varying text and/or characters and can accordingly categorize and differentiate between varying packages. OCR software combined with hardware such as a camera mounted so as to capture an image of the package yields a method for identifying the package and product type.

Figure 6:
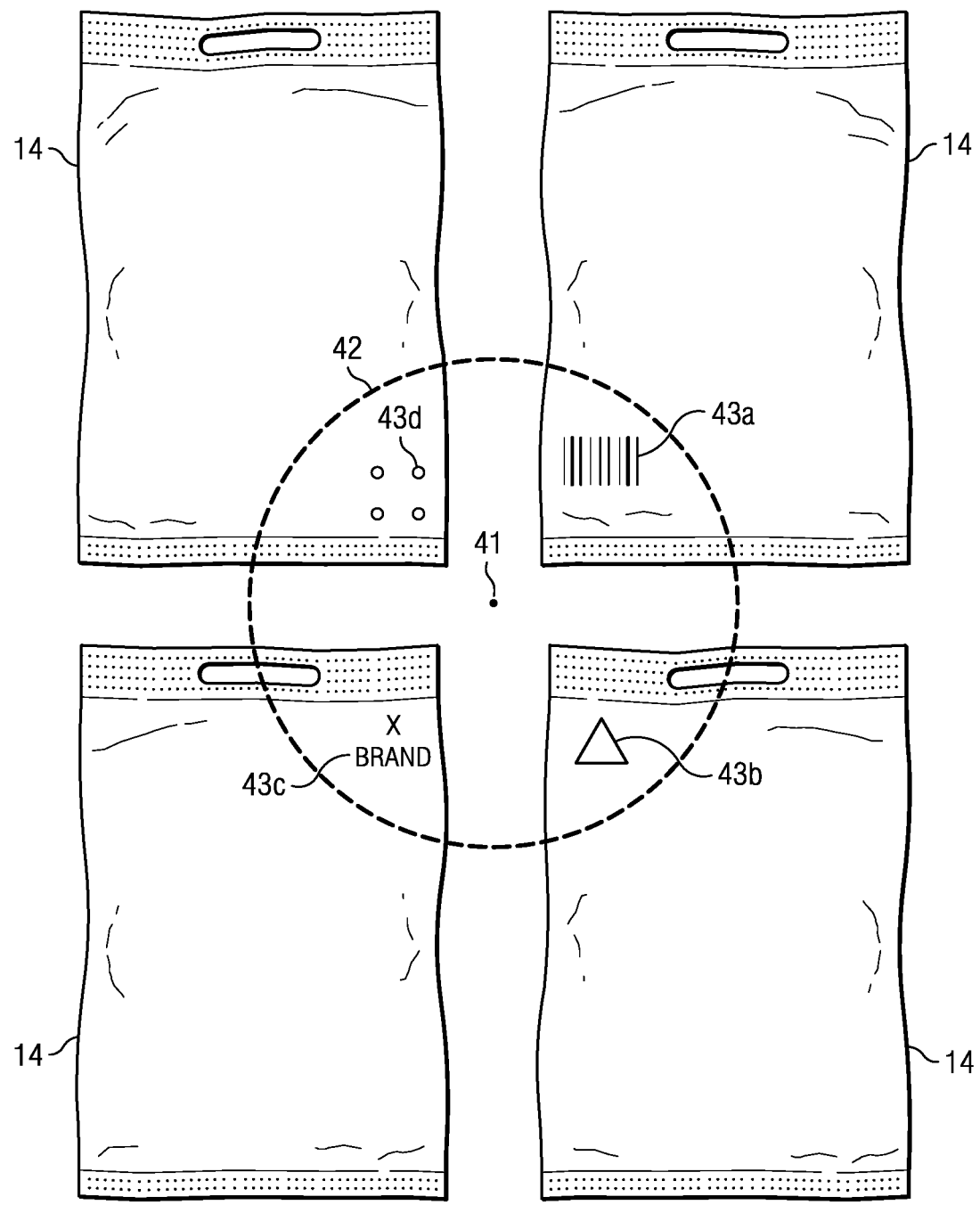
FIG. 6 is a back profile view of one embodiment utilizing a camera.

FIG. 6 is a back profile view of one embodiment utilizing a camera. In the embodiment shown, the camera is mounted on the back of the shelf so that it faces the backside of the packages. As with the sensor and the SKU reader, both previously described, the camera 41 can be mounted on the display apparatus, the crossbeam, or a separate mounting apparatus. Further, in some embodiments the camera 41 can be advantageously located in front of the shelf so that the front image of the package is captured. In the embodiment shown the camera 41 is positioned to be able to capture SKU's 43a-d from four adjacent packages. FIG. 6 illustrates four possible SKU's including a bar code 34a, a unique image 43b, a unique colored dot scheme 43c, and a unique character set 43d. Thus, the camera, in conjunction with the OCR software can recognize from its SKU 43d that the top left package comprises a certain product and has a specific thickness. In one embodiment, the software matches the image of the SKU 43d with an image stored on a database. Simultaneously, the camera 41 can identify the product type and thickness of the top right package by its SKU 43a. Although the camera 41 depicted in FIG. 6 is positioned to be able to recognize four packages, in other embodiments it may be desirable to only recognize one or two packages. Thus, utilizing the OCR method allows the apparatus to distinguish between two brands of snack food, for example, sitting adjacent on a shelf. The ability to identify a package with OCR, which results in ascertaining the thickness of the identified product, coupled with the measured distance allows the number of packages on a shelf or hanger to be calculated.

As discussed previously, a camera can be utilized as a sensor to determine a distance. Further, as discussed above, a camera in conjunction with OCR technology can be used to recognize a product's SKU and accordingly a product type. Thus, in one embodiment a single device measures the distance from a sensor and a package closest to a back end of the shelf and ascertains the thickness of the package by identifying the package SKU.

In one embodiment, once the data is measured and collected from the sensor and/or the SKU reader or any other identifying or counting means, it is then harvested into a harvesting device. As used herein "data" refers to any information which may be retrieved from the shelf including, for example, number and type of products on the hanger, number and type of products on the entire shelf and in the entire store, location of each product, the date and time each product was removed from the shelf, etc. In one embodiment the harvesting device, which harvests data from at least one sensor, comprises a Programmable Logic Control (PLC). Harvesting devices, in some embodiments have the ability to harvest as well as utilize the data, by, for example, performing calculations. Thus, in some embodiments the harvesting devices calculate the desired output, specifically the number and perhaps type of packages on a shelf as well as their location, from the collected data. Those skilled in the art armed with the instant disclosure will appreciate various methods and devices which can be used to calculate the desired output from the collected and/or input data.

The data can be transferred via Ethernet cables, or alternatively, the data can be transferred wirelessly through a wireless network. In another embodiment the data is harvested in a personal computer, and in another embodiment the data is harvested in a smart phone. Those skilled in the art will appreciate the different harvesting devices which can be utilized to achieve the desired goal. Each of these devices allows data to be compiled, stored, and transferred to other devices such as a handheld device. Thus, a stocker can retrieve the data from the harvesting device via a smart phone and know which and how much of each product must be restocked.

In another embodiment, once data is collected by the harvesting device, the data is triangulated with other data to produce more accurate data. For example, even if the amount and type of product located on a shelf is known, that data may not always adequately predict the amount and type of product located within a store. This difference can arise when a consumer removes a package from one shelf, decides they do not want to purchase the product and places the package elsewhere in the store. If the store were relying solely on data collected from the shelves then that data could indicate that the store has less product than it actually does. However, the harvesting device or other devices downstream of the harvesting device can be triangulated with other data such as data retrieved from the point of sale register. The point of sale data can indicate that the package removed from the shelf has not yet been purchased. Thus, in the above scenario, the data collected from the harvesting device is merged with the data collected at the point of sale register to determine an accurate inventory. Another example of data which may be triangulated or reconciled is data compiled from the store receiving end. Retail stores typically receive and inventory product in a receiving end of the store before stocking the product. Additionally, damaged and/or expired product is occasionally returned to the manufacturer from such a receiving end. Thus, an accurate amount of inventory in a store can be determined by reconciling the data received from the receiving end, which can include both incoming and outgoing product, the data received from the point of sale, as well as the data received from the apparatus of the instant invention. Those skilled in the art armed with the instant disclosure will appreciate other types of data to triangulate as well as the method of triangulating the data.

The sensors and harvesting devices generally require power to operate. Thus, in one embodiment the sensors and/or the harvesting devices are connected to an electrical outlet. In another embodiment, the sensors and/or the harvesting devices are connected to a remote power source such as a battery or solar device, which can operate without being connected to an electrical outlet. Those skilled in the art armed with the instant disclosure will appreciate other such remote power sources which can be utilized in conjunction with the instant invention. Using such a remote power source allows the shelves to be easily repositioned without need for the shelf to be located in close proximity to an electrical outlet.

Thus, in one embodiment a method for monitoring inventory is disclosed using a self-adjusting shelf which has at least one product support having sufficient capacity for a plurality of packages and having at least one package, wherein the distance from a sensor located on the shelf and the package closest to the back end of the shelf is measured, the thickness of the package closest to the back end of the shelf is ascertained, and the number of packages remaining on the shelf is calculated. In one embodiment, the apparatus for storing a monitoring inventory includes a self-adjusting shelf with at least one product support, and at least one sensor which can measure distances.

While the invention has been discussed in reference to a self-adjusting shelf, the invention is also applicable to other types of shelves including a manual shelf. As used herein a manual shelf refers to a shelf which is not self-adjusting. Thus, a consumer must manually remove product, and unlike a self-adjusting shelf, the product is not automatically positioned on the shelf. One example of such a shelf includes a hanging shelf in which the hangers are not declined. When a consumer removes a product, the remaining product does not automatically adjust and reposition itself on the shelf. A typical vending machine is another illustration of a manual shelf that comprises hangers from which the product hangs. Another example is a flat shelf upon which product is placed.

Figure 7:
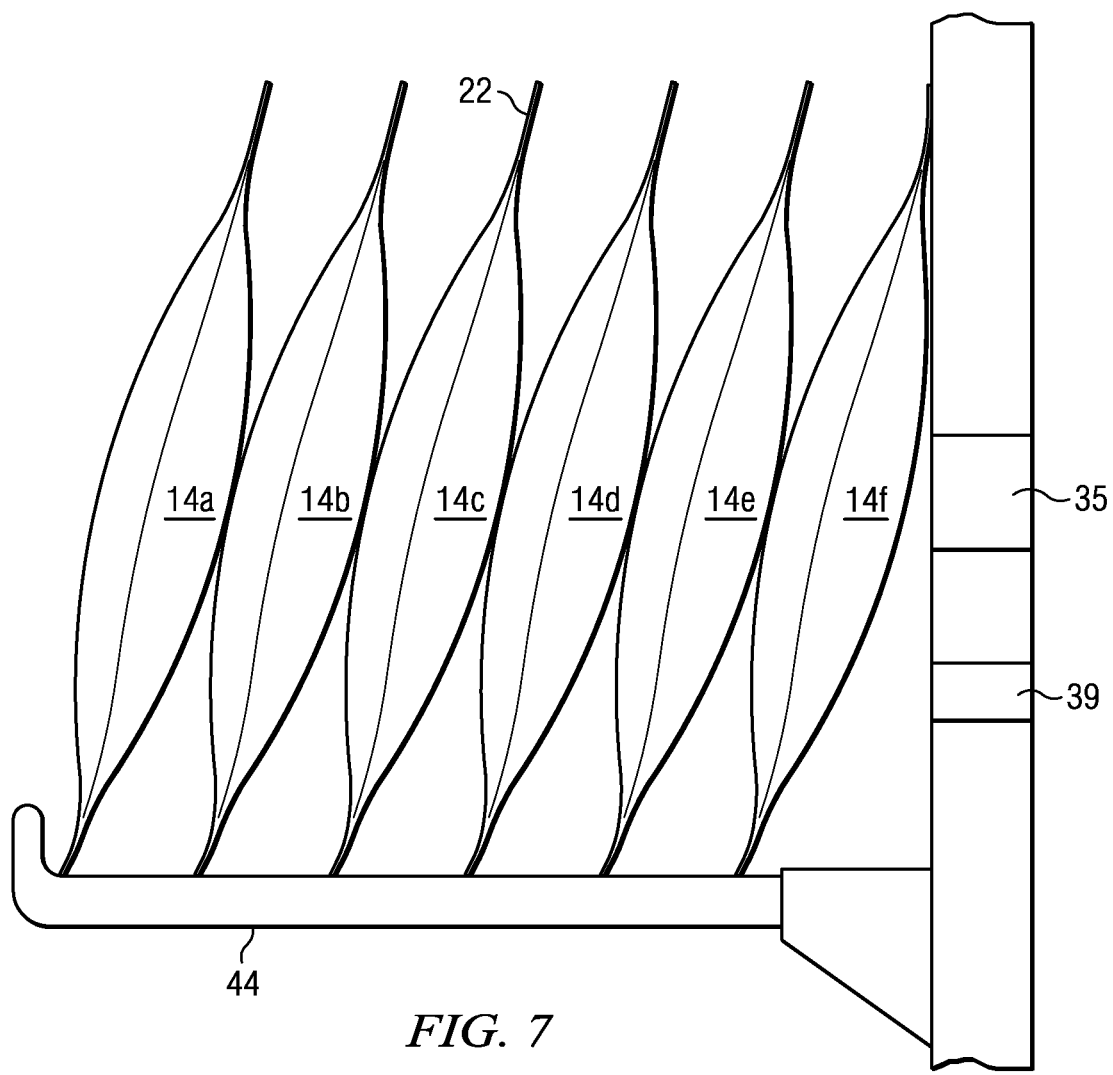
FIG. 7 is a side profile view of one embodiment utilizing a flat shelf.

FIG. 7 is a side profile view of one embodiment utilizing a flat shelf. In a flat shelf the product sits upon the product support 44. FIG. 7 depicts a detector 35 located behind the last package 14f. As will be demonstrated below, however, the detector 35 can be located in a variety of places including below, atop, aside, or in front of the package.

The detector 35 can comprise any type of sensor previously discussed. As used herein a detector refers to a device which detects the presence of an object. The detector may be analog or digital. The detectors may utilize infrared light, sound, or other methods known in the art to detect the presence of an object. The detector chosen for an embodiment will depend upon the material of the package, the distance between the detector and the package, the amount of light on the shelf, as well as other factors. Those skilled in the art will be able to determine the optimum detector for a given embodiment.

In one embodiment the detector 35 detects the presence of a package located on a product support. In the figure, the detector 35 will thereby return an "ON" signal to the harvesting device indicating that a package is located on the product support 44. If the first package in line 14a is removed, the detector 35 will still read the last package 14f and will return "ON" signal to the harvesting device indicating that a package is located on the product support 44. Likewise, if the last package in line 14f is removed, the detector will detect the presence of the next closest package 14e. When all packages are removed, the detector 35 will not detect a package and will return an "OFF" signal to the harvesting device indicating that the product support 44 does not have any packages. In one such embodiment, the detector can detect distances for the entire length of the product support. In one embodiment, the detector 35 has a range of at least 380 mm.

In one embodiment, the detector is utilized in a self-adjusting shelf as previously discussed. For example, referring to FIG. 5, the sensor 35 will comprise a detector 35 which functions as discussed above. Put differently, the detector 35 detects the presence of the last package 14f on the shelf.

Referring back to FIG. 7, in another embodiment, the detector 35 is laterally adjustable relative to the shelf so that one detector 35 can detect the presence of packages 14a-f on multiple product supports 44. Accordingly, in one embodiment a single detector can detect the presence or absence of product on each product support and each shelf. In such an embodiment, a detector will monitor the product on one product support and then move to monitor the product on a different product support. This information is then relayed to a harvesting device, as discussed above, indicating when a product support or shelf is empty and needs restocking. The method and apparatus described can be used in a variety of manual shelves including flat, hanger, etc.

Figure 8:
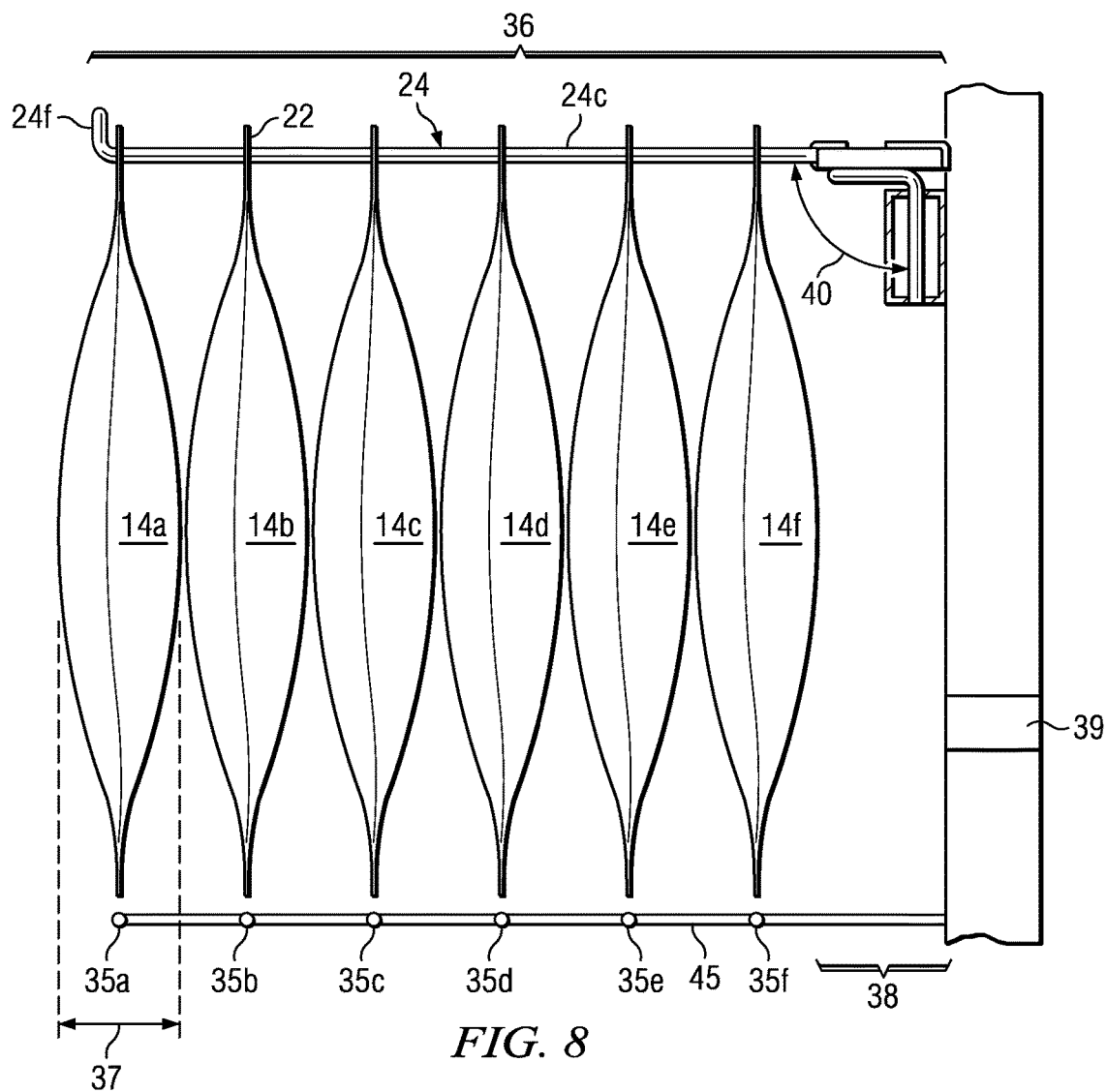
FIG. 8 is a side profile view of one embodiment utilizing a hanger shelf.

FIG. 8 is a side profile view of one embodiment utilizing a hanger shelf. In this embodiment, detectors 35a-f are located below each package so that the number of packages on a product support can be ascertained. In one embodiment, the detectors 35a-f are spaced apart according to the thickness 37 of the package. Accordingly, if a thicker package is on the shelf, the space between adjacent detectors 35a-f is adjustable to account for the increased thickness 37 of the package.

Those skilled in the art will understand how to position the detectors in the shelf. As depicted the detectors are stored on a rod 45 located below the package, but the detectors 35*a-f* can be located in a variety of places. In other embodiments the detectors are located above or to the side of the packages.

Referring to FIG. 8, a detector 35*a* will detect the presence of the package 14*a* above it. As depicted all six packages are present and will be detected by the detectors 35*a-f*. The detectors 35*a-f* will then report that six packages are on the product support 24 by adding the positive responses from each detector 35*a-f*. Thus, the number of packages on each product support 24 is ascertained by detecting the presence of each package on each product support 24. If the first package 14*a* is removed, the first detector 35*a* will not detect a package. Thus, the detectors 35*a-f* will collectively report that five packages are on the product support 24. Those skilled in the art will appreciate that different detectors and configurations may be implemented in detecting the presence of a package and ascertaining the number of packages on a shelf.

In one embodiment there is one detector for every package on the product support 24. Thus, a product support 24 which has six packages will have six detectors. In other embodiments, however, there are fewer detectors than packages. For example, FIG. 8 illustrates six packages 14*a*-14*f* and six detectors 35*a-f*. However, in one embodiment fewer than six detectors are utilized. In one embodiment only a select number of detectors are utilized in either the outer region or interior region of the shelf. If detectors are only located on the outer region, the first three detectors 35*a-c* would be located under the first three packages 14*a-c*. There would not be any detectors under the remaining packages 14*d-f*. The reason for this is that consumers often take the first package in a shelf. When this happens, the shelf would indicate that the first package has been taken and needs restocking. While this embodiment does not track every package, the assumption is that the shelf would be restocked before the remaining three packages 14*d-f* are selected by the consumer. In other embodiments the detectors may only be placed near the last package 14*f*. In still other embodiments the detector is only placed so as to detect packages in the center of the product support.

In another embodiment the detector is adjustable relative to the product support. The detector may be adjustable along the length of the product support so that one detector may detect the presence of one or more packages on one product support. In such an embodiment, the number of packages on a product support is ascertained by moving the detector along the product support. In such an embodiment, the detector is trained to move a specified distance and detect packages. In one embodiment the specified distance is proportional to the thickness of a package. As an example, referring to FIG. 8, the first sensor 35*a* will move along the rod 45 at a specified distance 37 to detect the presence of multiple packages above it. In this manner, the number of packages on a product support is ascertained by adding the number of packages detected on that product support.

In yet another embodiment, the detector may be adjusted angularly. Thus, the detector may detect the presence of a package at one location and then aim and detect the presence of a package at a different location. In such an embodiment, the detector can be positioned aside the package, above the package, below the package, and any other place whereby the detector can detect multiple packages at one time. For example, referring to FIG. 8, the second sensor 35*b* detects the presence of the second package 14*b* and is then aimed to detect the presence of the first 14*a* and third 14*c* package. Those skilled in the art will understand that in some embodiments the detector is adjustable angularly and relative to the product support.

In another embodiment, a camera is utilized to detect the presence of the packages and/or ascertain the number of packages on a product support. As previously discussed, a camera in conjunction with OCR technology can detect the presence of a package. For example, a camera can be mounted so as to obtain a perspective view of the packages 14*a-f* on the shelf 24. In one embodiment, edge detection software allows the user to compute the number of packages on a shelf.

As with the shelf-adjusting shelf, the embodiment of the manual shelf optionally comprises the ability to identify the product type of the package via an identifying device. This may accomplished in any of the ways previously discussed, including using a product SKU, and/or OCR software and hardware. Further, a single device can be used to detect the presence of the package and identify the product type of the package. As depicted in FIGS. 7 and 8, the SKU reader 39 is located behind the product 14*f* on the shelf 24, but the SKU reader can be positioned in a variety of locations.

The identifying device can utilize the same methods previously discussed to identify and/or ascertain the number of products. For example, as discussed the identifying device can utilize edge detection software and hardware to identify and/or ascertain the number of products. As another example, software and hardware which stores an image of a product, obtain an image of a product, and reconcile the stored and obtained package to yield the distance, the product type, the number of packages, etc. One such method compares the number of pixels in the stored and obtained image to obtain the desired information. Those skilled in the art will understand other software and hardware which can accomplish the described goals.

In one embodiment the identifying device can be adjusted laterally relative to the shelf such that one identifying device is capable of identifying packages located on two or more product supports. Likewise, in one embodiment the identifying device can be adjusted relative to the product support so that one identifying device is capable of identifying packages located along the product support. Thus, one product support can hold multiple flavors or brands of product and the identifying device can keep track of this non-homogenous inventory.

The instant invention allows for more efficient and effective restocking and inventory monitoring. Aside from increased efficiencies, such real time data has other benefits as well. For example, the manufacturer will instantly know the consumer preferences for a variety of flavor possibilities. Furthermore, the manufacturer will be able to track the shelf date, or the time which specific package 14 has been on the shelf. For example, if the number of products on a shelf remains unchanged for three months, then the manufacturer knows the product has been sitting on the shelf for three months as well. Such information would inform the manufacturer that perhaps that product is not selling well, or perhaps that there is too much shelf space dedicated to that product and that another product should take its shelf place. Such information in undoubtedly beneficial to the manufacturer for a multitude of reasons.

Furthermore, while the invention has been described with regard to a retail store, the invention is not so limited. For example, the apparatus and method of the instant invention can be used in a warehouse to monitor inventory. Further, the instant invention can be applied to industrial applications for monitoring inventory manufacturing parts. Taken further, as the instant invention can provide real time data, an apparatus of the instant invention can be integrated into a manufacturing process wherein subsequent steps of a manufacturing process cannot begin until it is verified that the prior step utilized all the required parts. As an example, before a final manufactured product is painted or shipped, the method and apparatus of the instant invention can verify by monitoring inventory that all the necessary parts have been used, and thus the necessary manufacturing steps have been completed. This can result in increased efficiency and increased product quality.

While the invention has been particularly shown and described with reference to a preferred embodiment, it will be understood by those skilled in the art that various changes in form and detail may be made therein without departing from the spirit and scope of the invention.

What is claimed is:

1. An apparatus for storing product packages and monitoring inventory comprising:
   a shelf comprising a product support, wherein the product support is configured to support a plurality of product packages;
   a detector associated with the shelf, the detector configured for detecting automatically and in real time a lateral displacement of one of the plurality of product packages on the product support;
   a transmitter configured to electronically communicate detected data about product packages on the shelf in real time, the data including the lateral displacement of product packages on the product support and an identity of the product packages; and
   a harvesting device in real time data communication with the transmitter and with downstream vending devices;
   wherein the harvesting device calculates a number of product packages on the product support;
   wherein the apparatus is configured to automatically distinguish between a product which has a first associated package thickness and another product having a second associated package thickness that is different from the first associated package thickness, based on identifying average package thickness data for each product stored in the harvesting device, and is configured to use average package thickness data associated with a particular product to calculate a number of packages of said particular product on a product support.

2. The apparatus of claim 1, wherein the shelf comprises a plurality of product supports.

3. The apparatus of claim 2, wherein each of the product supports comprises at least one detector.

4. The apparatus of claim 1, wherein the apparatus further comprises a tracking sensor.

5. The apparatus of claim 1, wherein the detector and the harvesting device are in communication via a wireless network.

6. The apparatus of claim 1, wherein the harvesting device harvests data relating to shelf location.

7. The apparatus of claim 1, further comprising a stock keeping unit.

8. The apparatus of claim 7, wherein the stock keeping unit is configured to read any of: a bar code, a unique image, a unique color dot scheme, and a unique character set.

9. The apparatus of claim 7, wherein the shelf comprises at least two product supports, and further wherein the stock keeping unit is laterally mobile relative to the shelf to identify packages located on the at least two product supports.

10. The apparatus of claim 7, wherein the stock keeping unit comprises Optical Character Recognition software and hardware.

11. The apparatus of claim 1, wherein the shelf comprises at least two product supports, and further wherein the detector moves laterally relative to the shelf such that the detector detects packages located on the at least two product supports.

12. The apparatus of claim 1, wherein the detector moves along the product support.

13. The apparatus of claim 1, wherein the shelf is a self-adjusting shelf.

14. The apparatus of claim 1, wherein the apparatus is configured to communicate wirelessly with a communications network.

15. The apparatus of claim 1, wherein the detector comprises any of: a photo-electric sensor, an ultra-sonic sensor, and a camera.

16. An apparatus for storing product packages and monitoring inventory comprising:
    a shelf comprising a plurality of product supports, wherein each of the plurality of product supports is configured to support a plurality of product packages;
    a detector associated with the shelf, the detector configured for detecting automatically and in real time a lateral displacement of one of the plurality of product packages; and
    a transmitter configured to wirelessly communicate detected data about the plurality of product packages on the shelf to a harvesting device in real time, the data including the lateral displacement of product packages and the identity of the packages on a product support;
    wherein the harvesting device calculates a number of product packages on the product support in real time; and
    wherein the apparatus is configured to automatically distinguish between a product which has a first associated package thickness and another product having a second associated package thickness that is different from the first associated package thickness, based on identifying average package thickness data for each product stored in the harvesting device, and is configured to use average package thickness data associated with a particular product to calculate a number of packages of said particular product on a product support.

17. The apparatus of claim 16, wherein each of the plurality of product supports comprises at least one detector.

18. An apparatus for storing product packages and monitoring inventory comprising:
    a shelf comprising a plurality of product supports, wherein each of the plurality of product supports is configured to support a plurality of product packages;
    a detector associated with the shelf, the detector configured for automatically and in real time detecting a lateral displacement of one of the plurality of product packages and an identity of the one product package;
    a transmitter configured to wirelessly communicate detected data about the plurality of product packages on the shelf to a network in real time, the data including the lateral displacement of product packages on a product support and the identity of the product packages;

a harvesting device in data communication with the transmitter, wherein the harvesting device calculates in real time a number of product packages on the product support; and a stock keeping unit configured to automatically read any of: a bar code, a unique image, a unique color dot scheme, and a unique character set, the stock keeping unit optionally including Optical Character Recognition software and related hardware;

wherein the apparatus is configured to automatically distinguish between a product which has a first associated package thickness and another product having a second associated package thickness that is different from the first associated package thickness, based on identifying average package thickness data for each product stored in the harvesting device, and is configured to use average package thickness data associated with a particular product to calculate a number of packages of said particular product on a product support.

19. The apparatus of claim 18, wherein the stock keeping unit is laterally mobile relative to the shelf to identify packages located on two or more product supports.

\* \* \* \* \*